United States Patent [19]

Kubota

[11] Patent Number: 4,472,940
[45] Date of Patent: Sep. 25, 1984

[54] TANDEM MASTER CYLINDER

[75] Inventor: Hitoshi Kubota, Fujisawa, Japan

[73] Assignee: Nissan Motor Company, Limited, Yokohama, Japan

[21] Appl. No.: 265,043

[22] Filed: May 18, 1981

[30] Foreign Application Priority Data

May 20, 1980 [JP] Japan .................................. 55-67335

[51] Int. Cl.³ ............................................. B60T 11/20
[52] U.S. Cl. ....................................... 60/562; 60/578; 137/522
[58] Field of Search ................. 60/562, 574, 578, 588; 137/522

[56] References Cited

U.S. PATENT DOCUMENTS

| | | | |
|---|---|---|---|
| 2,291,056 | 7/1942 | Pallady | 60/578 |
| 2,508,403 | 5/1950 | Knauss | 60/578 |
| 2,742,054 | 4/1956 | Poundstone | 137/522 |
| 3,143,860 | 8/1964 | Stelzer | 60/562 |
| 3,818,706 | 6/1974 | Gaiser | |
| 4,086,770 | 5/1978 | Shaw | |
| 4,170,386 | 10/1979 | Shutt | 60/574 |

FOREIGN PATENT DOCUMENTS 2000235  1/1979  United Kingdom .................. 60/574

Primary Examiner—Abraham Hershkovitz
Attorney, Agent, or Firm—Schwartz, Jeffery, Schwaab, Mack, Blumenthal & Koch

[57] ABSTRACT

A master cylinder, according to the present invention comprises a primary piston and a secondary piston disposed within a bore of a cylinder housing in tandem relationship. The secondary piston has a sectional area facing to a secondary pressure chamber, which area is smaller than that of the primary piston facing a primary pressure chamber. The hydraulic pressure in the secondary chamber is regulated by a regulator valve means provided opposing thereto. The regulator valve means becomes operative when the hydraulic pressure applied to the secondary pressure chamber exceeds a predetermined value. Due to the difference of the sectional area between the primary piston and the secondary piston which respectively face to the primary and secondary pressure chambers, hydraulic pressure to be applied to the front and rear wheel cylinders is varied to reduce the pressure in the rear wheel cylinder for preventing skidding of the vehicle.

12 Claims, 11 Drawing Figures

TANDEM MASTER CYLINDER

BACKGROUND OF THE INVENTION

The present invention relates generally to a master cylinder in a hydraulic brake system for an automotive vehicle. More specifically, the invention relates to a tandem master cylinder having a primary piston and a secondary piston in tandem relationship and supplying the working fluid to front and rear wheel cylinders independently from each other.

The brake system master cylinder which has a primary piston for supplying working fluid to the rear wheel cylinders and a secondary piston for supplying the working fluid to the front wheel cylinders, has been known. In such a master cylinder, the primary piston and the secondary piston are positioned in the housing in tandem relationship so that they can be operated cooperatively by application of a brake pedal. As is well known upon applying the brake, the load applied to the front wheels is greater than that on the rear wheels, and, this phenomenon leads to what is known as the nose dive phenomenon. This causes locking of the rear wheels prior to locking of the front wheels and thus skidding of the vehicle. In the case of locking of the rear wheels prior to the front wheels, the vehicle tends to spin about the front wheels.

For preventing the vehicle from spinning caused by locking of the rear wheels, there has been developed brake systems having proportioning valves in the hydraulic circuit for the rear wheel brake system. This increases the cost for the brake system and makes the hydraulic circuit for the brake system so complicate that it is difficult to assemble and maintain.

SUMMARY OF THE INVENTION

Therefore, it is an object of the present invention to provide a tandem master cylinder in the brake system which can simplify the hydraulic circuit and effectively prevent the rear wheels from skidding.

Another and more specific object of the present invention is to provide a tandem master cylinder having a means for relieving working fluid when the hydraulic pressure applied to the rear wheel cylinder exceeds a predetermined value.

For accomplishing the above-mentioned and other objects, a master cylinder, according to the present invention comprises a primary piston and a secondary piston disposed within a bore of a cylinder housing in tandem relationship. The secondary piston has a sectional area facing a secondary pressure chamber, which area is smaller than that of the primary piston facing a primary pressure chamber. The hydraulic pressure in the secondary chamber is relieved by a blow-off valve assembly provided opposite thereto. The blow-off valve means becomes operative when the hydraulic pressure applied to the secondary pressure chamber exceeds a predetermined value. Due to the difference of the sectional area between the primary piston and the secondary piston which respectively face the primary and secondary pressure chambers, hydraulic pressure to be applied to the front and rear wheel cylinders is varied to reduce the pressure in the rear wheel cylinder in relation to the front wheel cylinder for preventing skidding of the vehicle.

According to one embodiment of the invention, there is provided a tandem master cylinder in a brake system for an automotive vehicle comprising a cylinder housing formed with a stepped bore along the longitudinal axis thereof and having a smaller diameter section adjacent the bottom thereof, a primary piston disposed within the bore and defining a primary fluid chamber between the internal periphery of the bore, the primary fluid chamber being in communication with a fluid reservoir through a first fluid passage formed in the cylinder housing, a secondary piston disposed within the bore in tandem relationship with the primary piston and defining a primary pressure chamber between the primary piston, the primary pressure chamber in communication with the rear wheel cylinders in the brake system, and a secondary pressure chamber which communicates with the front wheel cylinders in the brake system within the smaller diameter section of the bore between the bottom of the cylinder housing and further defining a secondary fluid chamber between the internal periphery of the cylinder housing communicating with the fluid reservoir through a second fluid passage formed in the cylinder housing, a first and second means for establishing communication respectively between the primary fluid chamber and the primary pressure chamber and the secondary fluid chamber and the secondary pressure chamber, a blow-off valve assembly disposed between the secondary fluid chamber and the fluid reservoir for relieving hydraulic pressure in the secondary fluid chamber value, which blow-off valve assembly is responsive to the fluid pressure in the second fluid chamber and to that in the second pressure chamber for permitting fluid flow from the secondary fluid chamber to the fluid reservoir, when the pressure in the secondary fluid and pressure chambers exceed respective predetermined values.

BRIEF DESCRIPTION OF THE DRAWINGS

The present invention will become more fully understood from the detailed description given hereinbelow and from the accompanying drawings of the preferred embodiment of the present invention, which however, should not be taken as limitative to the present invention but for elucidation and explanation only.

In the drawings.

DESCRIPTION OF THE PREFERRED EMBODIMENT

Figure 1:
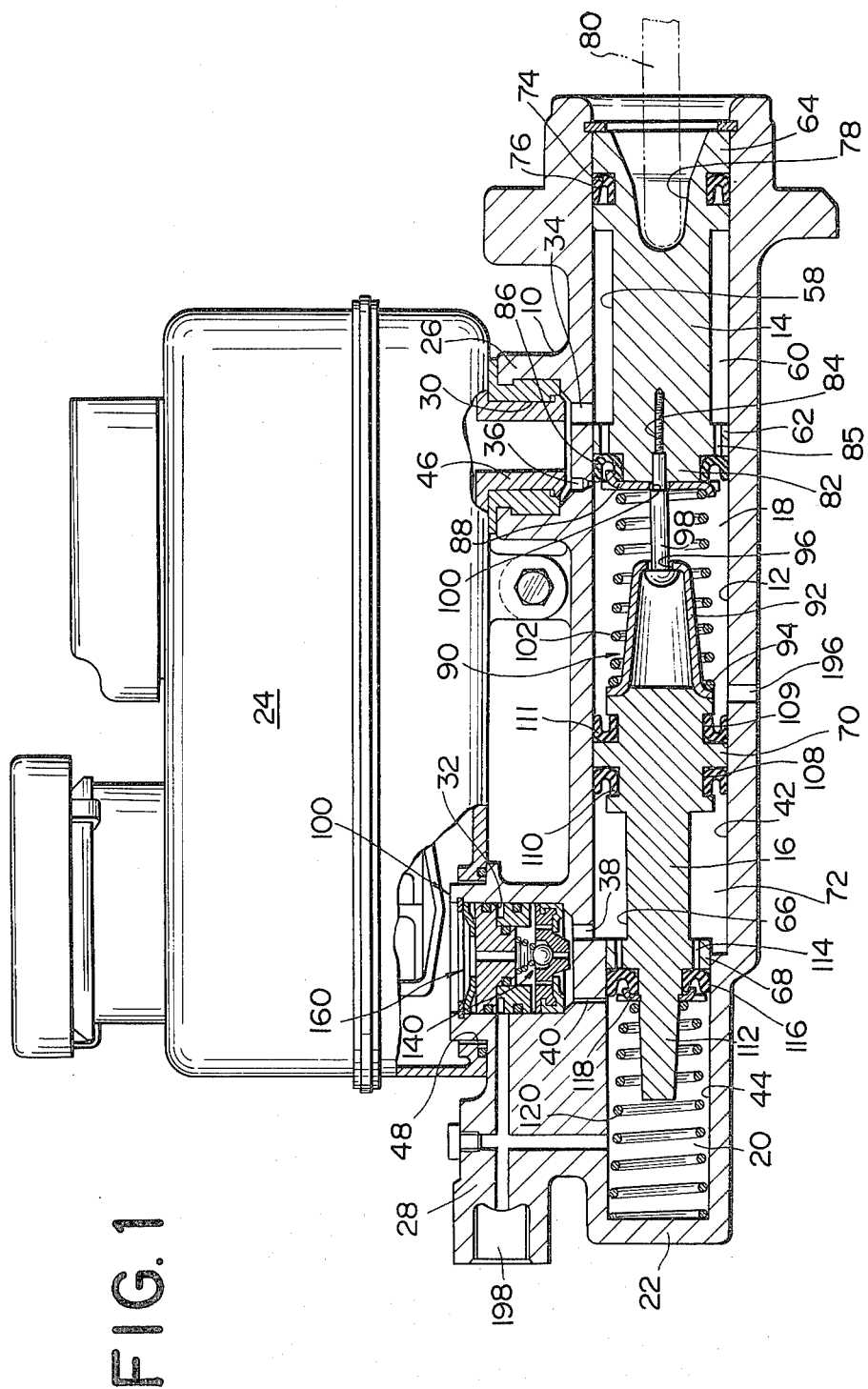
FIG. 1 is a longitudinal section of a first embodiment of a master cylinder according to the present invention.

Referring now to the drawings, particularly to FIG. 1, there is illustrated a preferred embodiment of a tandem master cylinder according to the present invention. The master cylinder comprises a cylinder housing 10 formed with a longitudinal bore 12 therein, which bore extends along the longitudinal axis of the housing 10. A primary piston 14 and a secondary piston 16 are respectively disposed within the bore 12 in aparting relationship with respect to one another. The primary and secondary pistons 14 and 16 define therebetween a primary pressure chamber 18 for building up the hydraulic pressure therein. The secondary piston 16 defines a secondary pressure chamber 20 with the bottom 22 of the housing 10.

Figure 2:
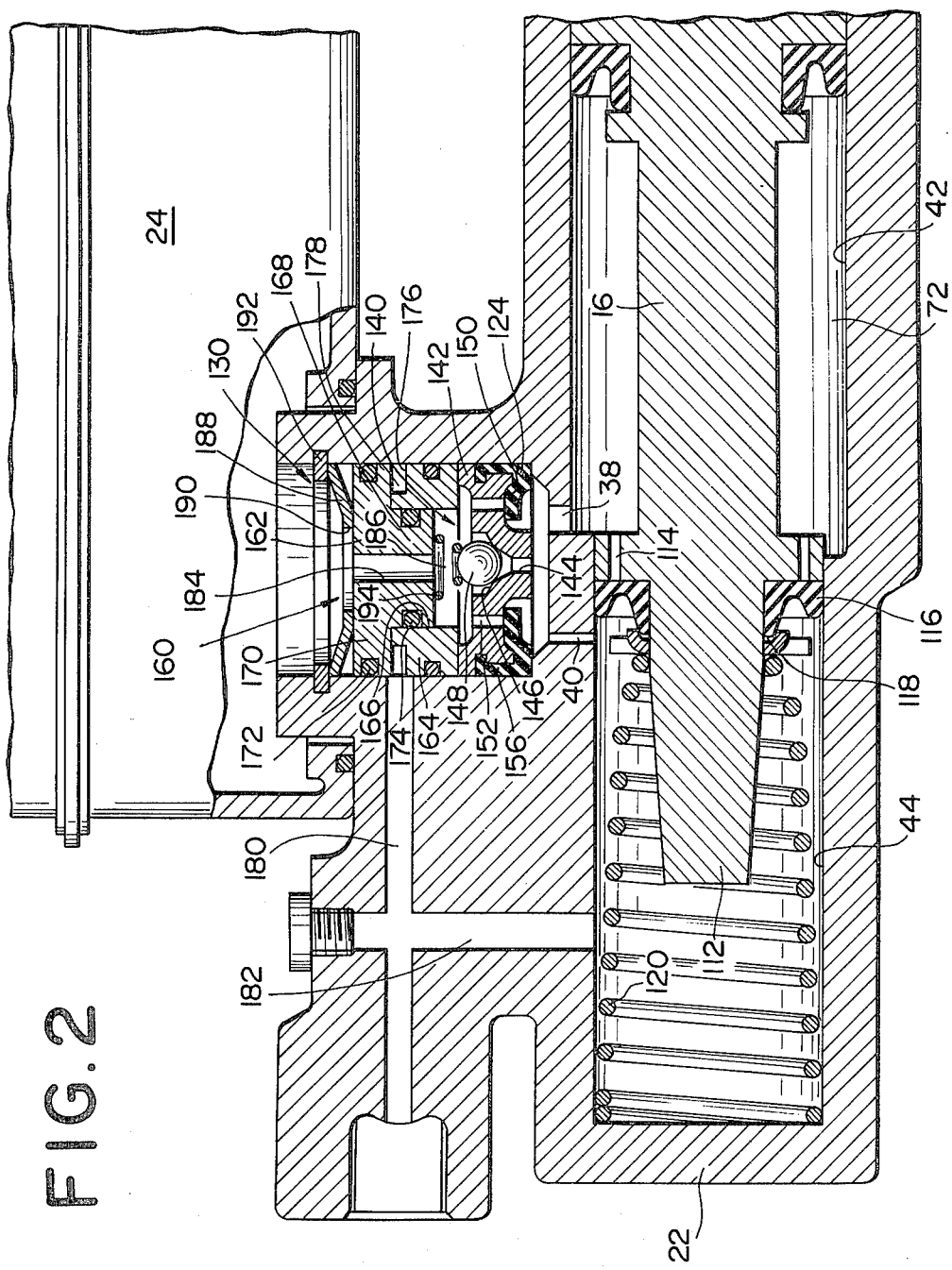
FIG. 2 is an enlarged partial section of the master cylinder, in which is illustrated a released position of a brake pedal.

The cylinder housing 10 is provided with projecting portions 26 and 28 laterally extending outwardly from the outer periphery thereof. Each projecting portion 26 and 28 is formed with bores 30 and 32. The bore 30 is communicated with the cylinder bore 12 via compensation passages 34 and 36. The bore 32 is also communicated with the cylinder bore 12 via a compensation passage 38 and an orifice 40. As clearly shown in FIG. 2, the compensation passage 38 opens to the larger diameter section 42 of the bore 12 and the orifice 40 opens to the smaller diameter section 44.

To the projecting portion 26, a mounting tube 46 of a fluid reservoir 24 is joined for communication between the fluid reservoir and the cylinder bore 12. On the other hand, the projecting portion 28 is received in an opening 48 formed in the fluid reservoir 24 for communication between the fluid reservoir and the cylinder bore 12.

The primary piston 14 is formed with an annular recess 58 on the outer circumference thereof to define a primary fluid chamber 60 with the internal periphery of the cylinder housing. The primary piston 14 is thus formed with a pair of flange sections 62 and 64 at both longitudinal ends thereof. Likewise, the secondary piston 16 is formed with an annular recess 66 on the outer circumference thereof to define a pair of flange sections 68 and 70 at both longitudinal ends thereof. The annular recess 66 defines a secondary fluid chamber 72 with the internal periphery of the cylinder housing 10.

On the outer circumference of the flange section 64 of the primary piston 14, there is formed an annular recess 74 for receiving a sealing ring 76. The primary piston 14 is also formed with a longitudinally extending bore 78 at the end adjacent the flange section 64. An input rod 80 for transmitting the brake force applied to a brake pedal (not shown) is received within the bore 78. On the other end remote from the input rod 80, the primary piston 14 has a projective portion 82 extending along the longitudinal axis thereof. At the center of the projective portion, a threaded bore 84 is formed. In the flange section 62, a plurality of through openings 85 extending longitudinal direction along the longitudinal axis of the primary piston 14 are formed adjacent the circumference thereof. Between an end of opening 85 and a primary pressure chamber 18, an annular piston cup 86 is mounted so that it permits fluid flowing from the primary fluid chamber 60 to the primary pressure chamber 18 but the fluid flow in the counter direction.

On the projective portion 82 of the primary piston 14, a substantially disc-shaped spring seat 88 is mounted. Opposite the spring seat 88, another spring seat 90 is positioned. The spring seat 90 has a cup-shaped central portion 92 and circumferential flange portion 94. The bottom of the central portion 92 is formed with an opening 96. A fastening screw 98 passes through the opening 96 and engages with the threaded bore 84 in the projective portion 82 via a central opening 100 formed in the spring seat 88. Between the spring seats 88 and 90, a set spring 102 is disposed to urge the spring seat 90 and the primary piston through the spring seat 88 in the direction opposite one another.

The flange sections 68 and 70 of the secondary piston 16 are of different diameter. The flange section 68 has a smaller diameter than that of the flange section 70 and is located within a small diameter section 44 of the bore 12. The flange section 70 is formed with an annular recesses 108 and 109 on the circumference thereof to receive sealing rings 110 and 111 therewithin. On the other hand, the secondary piston 16 has a projective portion 112 extending in the longitudinal direction along the longitudinal axis of the secondary piston 16 from the end thereof facing a secondary pressure chamber 20. The flange section 68 is formed with a plurality of through openings 114 extending longitudinally along the longitudinal axis of the secondary piston adjacent the circumference thereof. On the end of the through openings 114 facing the secondary pressure chamber 20, an annular piston cup 116 is mounted so that it permits fluid following from the secondary fluid chamber 72 to the secondary pressure chamber 20 but restrict the fluid flow in the counter direction. Adjacent the piston cup 116, an annular spring seat 118 is mounted and secured on the outer circumference of the projective portion 112. A set spring 120 is seated on the annular spring seat 118 at the one end and located opposing to the piston cup 116. The other end of the spring 120 is seated on the bottom 22 of the bore 12. Thus, the set spring 120 provides a spring pressure toward the primary pressure chamber 18 via the secondary piston 16.

In the bore 32, a blow-off valve assembly 130 is disposed for reliefing fluid pressure when the brake pressure built up in the secondary fluid chamber 72 and, in turn, in the secondary pressure chamber 20 exceeds a predetermined value. The blow-off valve 130 generally comprises a ball valve means 140 and a thrusting valve means 160. The ball valve means 140 includes a ball valve seat 142 formed, at the central portion thereof, With a vertically extending through opening 144 for communication between the fluid reservoir 24 and the secondary fluid chamber 72. The opening 144 has a bowl-shaped upper section 146 in which is seated a ball valve member 148. The ball valve seat 142 is formed with an annular recess 150 on the lower horizontal plane thereof. A plurality of vertical fluid passages 152 open to the recess 150 at the lower end thereof. In the recess, a elastic sealing member 154 is disposed for closing the lower ends of the vertical fluid passages 152. The sealing member 154 has a vertical section 156 which is sandwitched between the internal periphery of the vertical bore 32 and the outer periphery of the ball valve seat 142 for liquid-proof sealing.

The thrusting valve means 160 comprises a movable valve member 162 disposed within the vertical bore 32 in vertically movable position and a valve seat 164 secured on the internal periphery of the vertical bore 32 and opposing to movable valve member 162. The valve seat 164 is generally of annular ring shaped configration and defines a through opening 166 on the central portion thereof. The movable valve member 162 has a lower section 168 adapted to the through opening 166 to be received therein. On the outer peripheries of the upper and lower sections 170 and 168 of the movable valve member 162 is provided sealing rings 172 and 174 for liquid-proof sealing between the internal peripheries of the vertical bore 32 and the through opening 166. The valve seat 164 is formed with an annular cut-out 176 on the upper plane thereof adjacent the outer periphery thereof to define an annular chamber 178 which communicates with the lateral and vertical openings 180 and 182. The movable valve member 162 is formed with a vertical fluid passage 184 extending along the center axis thereof for communication between the fluid reservoir 24 and a chamber 186 defined between the movable valve member 162 and the ball valve seat 142.

The movable valve member 162 is normally urged toward the valve seat 164 by a disc-shaped spring 188 with a central opening 190. The outer periphery of the spring 188 is engaged with an annular stopper 192 secured on the internal periphery of the vertical bore 32. The upper end of a helical spring 194 is seated to the lower end of the movably valve member 162. The lower end of the helical spring 194 abuts against the ball valve member 148 for normally forcing the same toward the bowl shaped upper section 146 of the opening 144 for blocking fluid flow from the secondary fluid chamber 72 to the fluid reservoir 24.

A cylinder housing 10 is further formed with primary and secondary ports 196 and 198 respectively communicating with rear and front wheel cylinders via fluid passages.

In operation, when the brake pedal is in released position, relationship between the primary piston 14 and the secondary piston 16 with respect to the cylinder housing 10 is as shown in FIG. 1. In this position, the primary fluid chamber 60 communicates with the fluid reservoir 24 via the passage 34. Likewise, the secondary fluid chamber 72 communicates with the fluid reservoir 24 via the ball valve seat of pressure difference responsive valve 140 and the inlet port 38. On the other hand, the primary pressure chamber 18 communicates with the fluid reservoir 24 via the compensation passing 36 and the secondary pressure chamber 20 communicates with the fluid reservoir 24 via the orifice 40.

Upon applying the brake pedal, the brake pressure is applied to the primary piston 14 via the input rod 80. By application of the brake pressure, the primary piston 14 is moved toward the primary pressure chamber 18. The primary piston 14 interrupts communication between the primary pressure chamber 18 and the fluid reservoir 24 via the compensation passage 36 during the motion toward the primary pressure chamber. Namely, when the primary piston 14 travels to close the compensation passage 36 by the piston cup 86, the primary pressure chamber 18 is disconnected from the fluid reservoir 24. By further travel of the primary piston 14, the fluid pressure in the primary pressure chamber 18 is increased to force the working fluid therein to flow through the primary port 196 and the fluid passage to the rear wheel cylinder. The working fluid applied to the rear wheel cylinder urges the pistons in the rear wheel cylinder in opposite direction from one another. By this, the brake lining is fitted onto the brake drum in the well known manner.

Corresponding to the motion of the primary piston 14 toward the primary pressure chamber 18, the second piston 16 is urged toward the secondary pressure chamber 20 by the brake pressure applied via the screw 98 and the spring 102 and the spring seat 92. Thus, the secondary piston 16 is moved toward the secondary pressure chamber 20. During the travel toward the secondary pressure chamber 20, the piston cup 116 closes the relief or blow-off valve 130 to disconnect the secondary pressure chamber 20 from the fluid reservoir 24. On the other hand, by motion toward the secondary pressure chamber 20, the flange section 68 slides along the internal periphery of the smaller diameter section 44 to reduce the volume of the secondary fluid chamber 72. By reducing of the volume, the fluid pressure in the secondary fluid chamber 72 is increased to force the working fluid therein to flow toward the secondary pressure chamber 20 through the through openings 114 and the piston cup 116. Because of the fluid pressure in the secondary fluid chamber 72, the piston cup 116 is deformed to release the outer peripheral portion thereof from the inner periphery of the bore 12. Thus, the fluid in the secondary fluid chamber 72 is permitted to flow therethrough. At the same time, the fluid pressure in the secondary pressure chamber 20 is increased by reducing of the volume of the secondary pressure chamber 20. Because of the fluid flowing from the secondary fluid chamber 72 and the reduction of volume in the secondary pressure chamber 20, the hydraulic pressure in the secondary pressure chamber 20 is increased. The fluid thus pressurized is fed to the front wheel cylinders through the seconadary port 198. The pressurized fluid supplied from the master cylinder through the secondary port 198 actuates the front wheel cylinders to force the brake lining onto the brake drum.

At this time, since the working fluid in the secondary fluid chamber 72 is pressurized by reduction of the volume of the secondary fluid chamber 72, the working fluid in the secondary fluid chamber 72 flows from the secondary fluid chamber 72 into the secondary pressure chamber 20. Therefore, for providing sufficient brake pressure for the front wheel cylinders for loss-stroke, it requires a shorter piston stroke for the secondary piston 16 and thus, in turn requires a shorter stroke of the brake pedal. This may lead to a better brake feeling.

By further application of the brake pedal, the primary and secondary pistons 14 and 16 respectively travel toward the primary and secondary pressure chambers 18 and 20. Since the primary and secondary pressure chambers 18 and 20 are respectively disconnected from the fluid reservoir 24, the fluid pressure in the primary and secondary pressure chambers 18 and 20 and, in turn, that applied to the rear and front wheel cylinders is increased by the motion of the primary and secondary pistons 14 and 16. By increasing of the fluid pressure in the wheel cylinders, the pressure applied to the brake linings is increased to effect braking.

When the braking force applied to the brake pedal is released, the primary and secondary pistons 14 and 16 are forced toward the neutral position thereof by the return springs 102 and 120. At this time, due to the pressure difference between the primary pressure chamber 18 and the primary fluid chamber 60 and the secondary pressure chamber 20 and the secondary fluid chamber 72, the fluid respectively in the primary and secondary fluid chambers 60 and 72 flows into the primary and secondary pressure chambers 18 and 20 through gaps respectively formed between the internal periphery of the bore 12 and the outer periphery of the piston cups 86 and 116 through the passages 85 and 114. During the travel of the secondary piston, by expanding of the volume of the secondary pressure chamber 20, the pressure difference between the fluid reservoir 24 and the secondary fluid chamber 72 causes opening of the normally closed end of the ball valve means 140 to permit fluid flow therethrough.

The primary and secondary pistons 14 and 16 are further moved toward the primary and secondary chambers 18 and 20 to increase the fluid pressure therein. As apparent, since the sectional area of the secondary pressure chamber 20 is smaller than that of the primary pressure chamber 18, the fluid pressure built up in the secondary pressure chamber 20 is greater that in the primary pressure chamber 18. The fluid pressure in the secondary pressure chamber 20 becomes greater than that built up in the secondary fluid chamber 72. Therefore, the fluid flow from the secondary fluid chamber 72 to the secondary pressure chamber 20 is blocked. At this position, the fluid pressure in the secondary fluid chamber 72 is applied to the ball valve member 148. If the pressure applied to the ball member 148 becomes greater than the set pressure provided by the coil spring 194, the ball valve member 148 is moved and released from the bowl-shaped groove 116 against the set pressure to permit the fluid flow therethrough.

Figure 3:
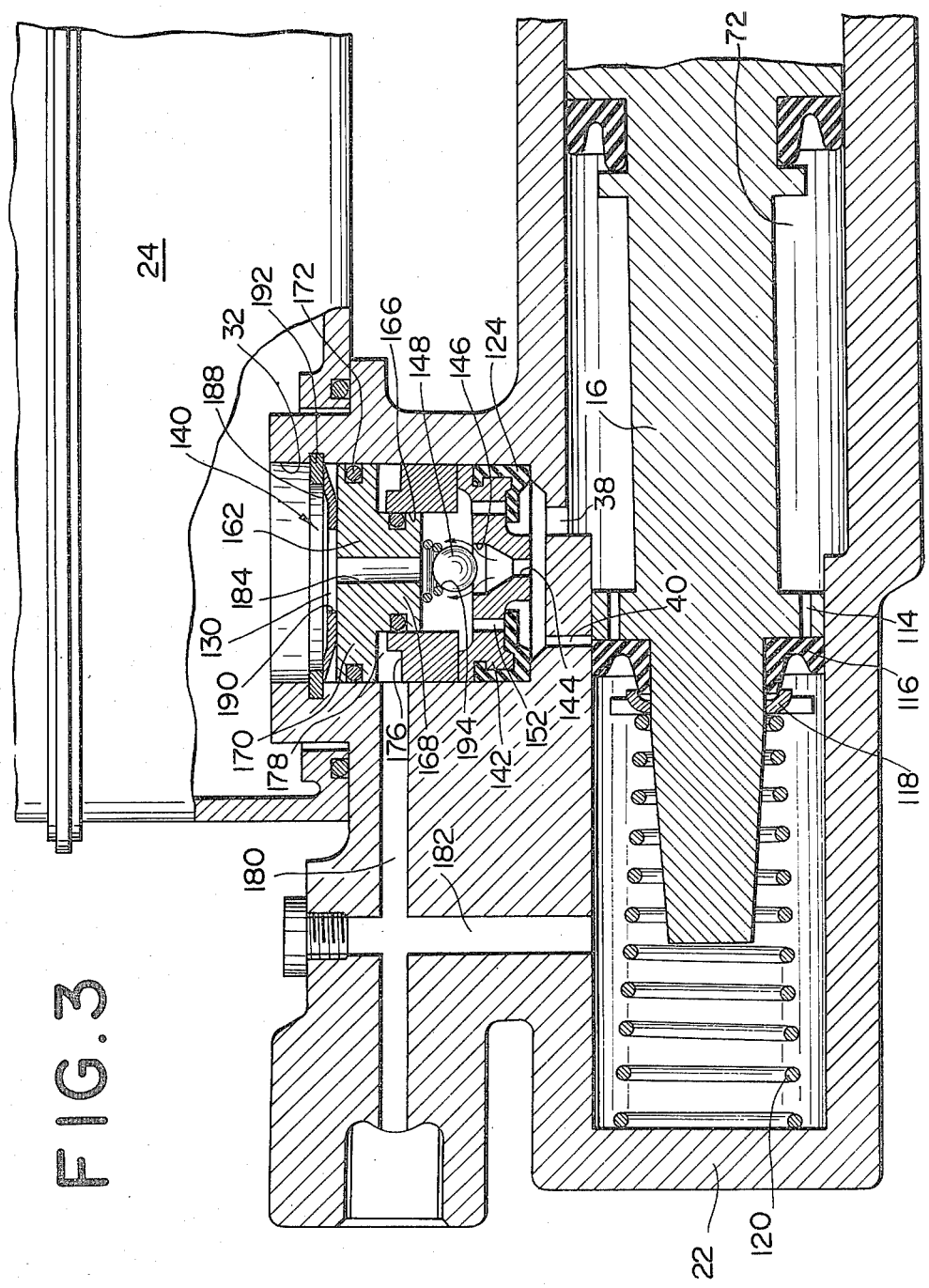
FIG. 3 is a similar view to FIG. 2 but showing the position in which the brake is applied and a blow-off valve is in operative position.

At the same time, the fluid pressure in the secondary pressure chamber 20 is applied to the annular chamber 178 (FIG. 3) to urge the movable valve member 162 in the direction releasing it from the valve seat 164. When the pressure in the secondary pressure chamber 20 exceeds the set pressure provided by the disc-shaped spring 188, the movable valve member 162 is moved to release it from the valve seat 164. By the motion of the movable valve member 162, the spring 194 is expanded to reduce the spring pressure. This causes a reduction of the set pressure applied to the ball valve member 148.

Figure 4:
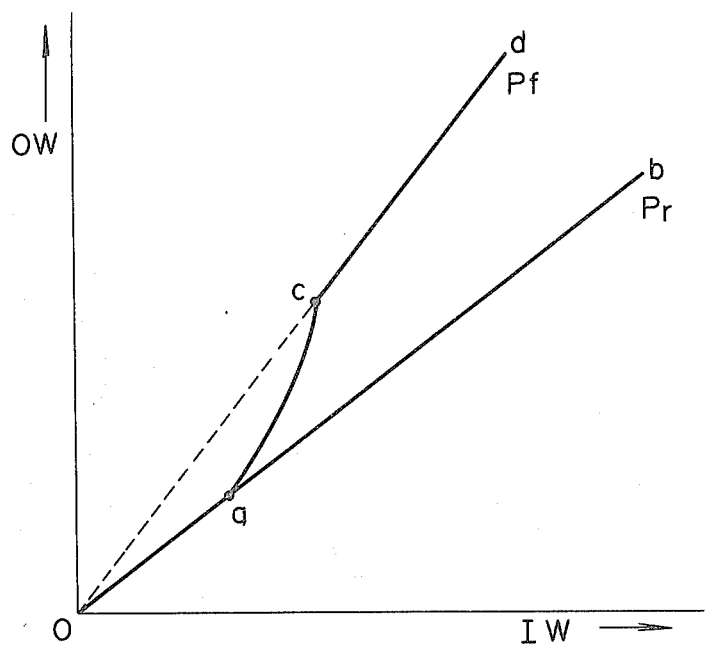
FIG. 4 is a graph showing a relationship between an input force (IW) applied through the brake pedal and an output force (OW) outputting fluid pressure to respective wheel cylinders.
Figure 5:
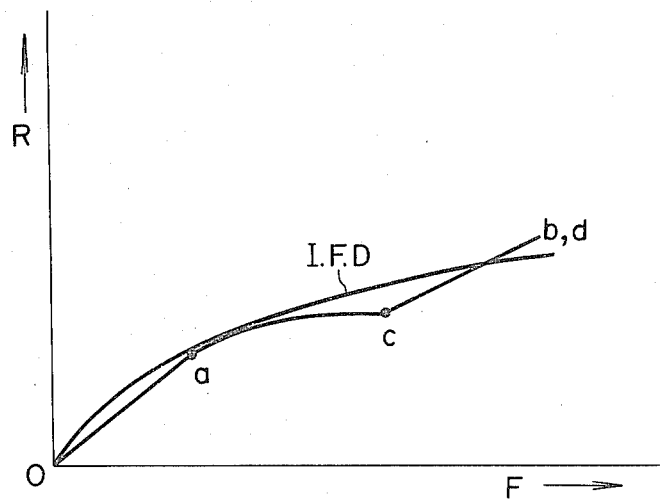
FIG. 5 is a graph showing a relationship of brake forces applied to the front wheel cylinder and rear wheel cylinder.

During the braking operation, the fluid pressure applied to the wheel cylinders is varied corresponding to application of the brake force to the brake pedal, as shown in FIG. 4. In FIG. 4, the brake pressure applied to the rear wheel cylinder (Pr) is varied in a linear fashion (o-a-b) and, on the other the brake pressure for the front wheel cylinder (Pf) is varied in an increasing ratio as indicated by the line o-a-c-d. During the piston stroke between the splits a to c, the blow-off valve 130 effects a pressure relieving operation. In turn, the relationship of the front and rear wheel cylinder brake pressure is as shown in FIG. 5. As seen from the thick line representing varying of the brake pressure, the varying of the braking pressure is approximated with the ideal force distribution line (I.F.D.).

Figure 6:
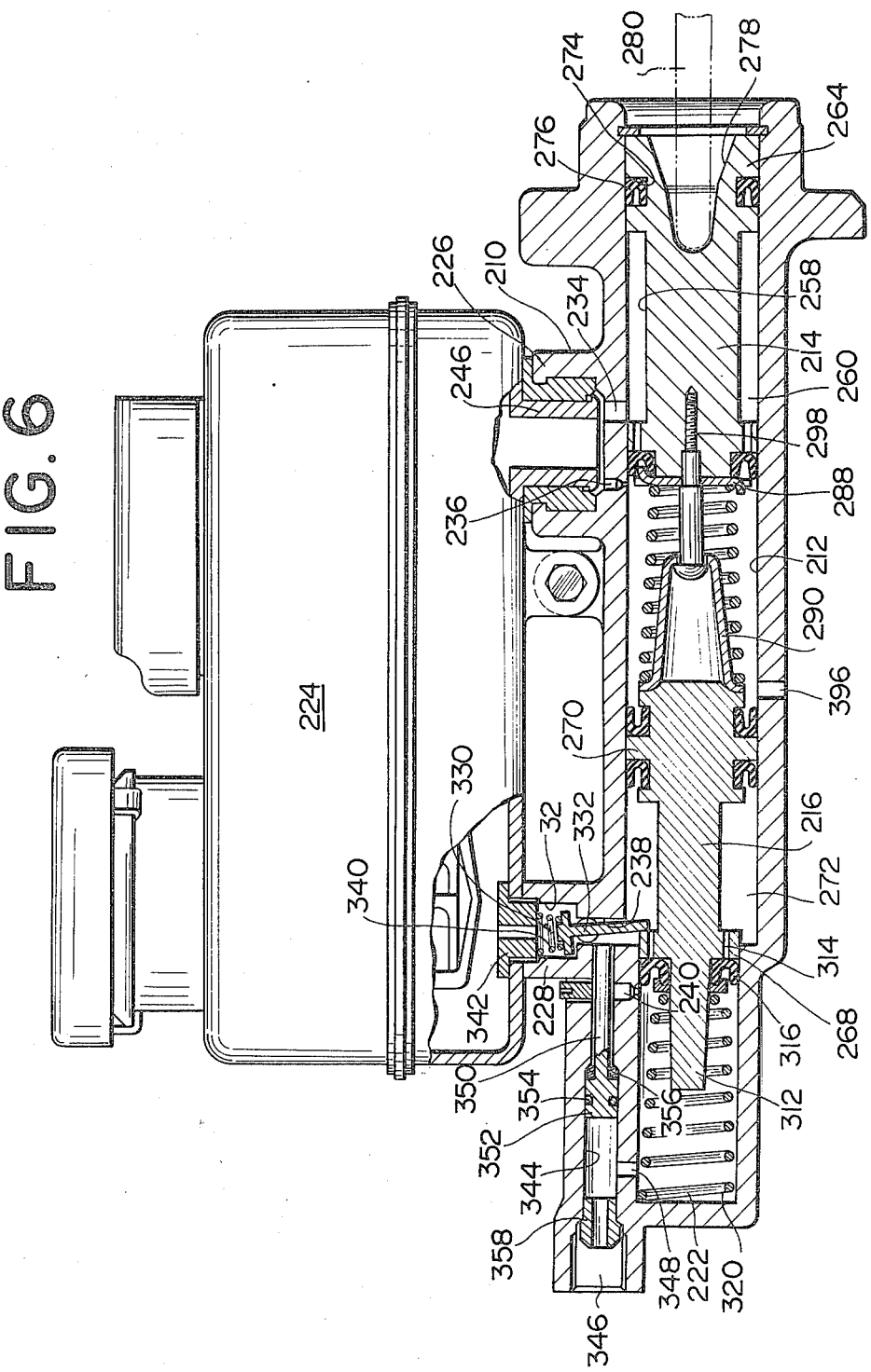
FIG. 6 is a longitudinal section of a second embodiment of the master cylinder according to the present invention.
Figure 7:
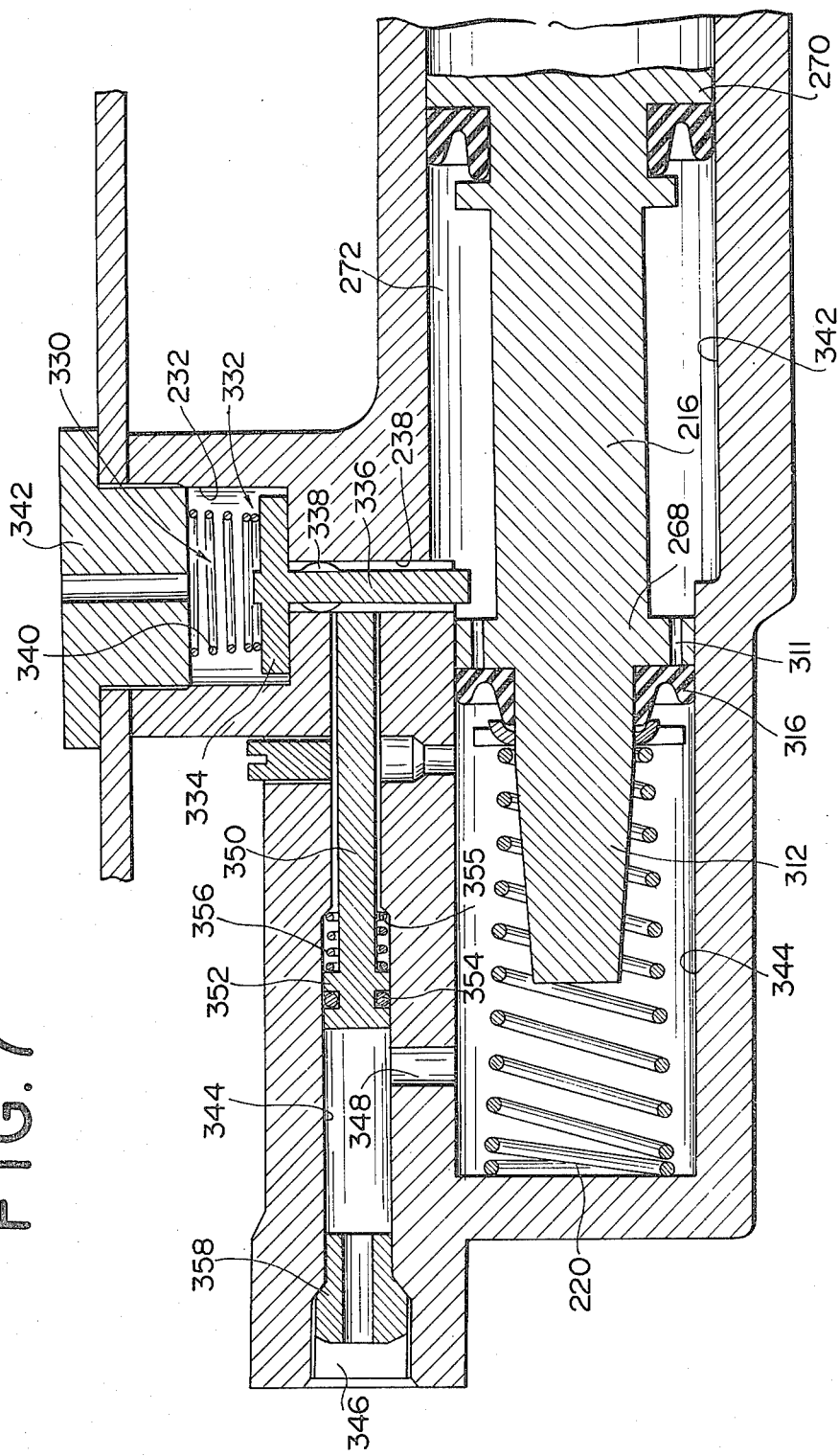
FIG. 7 is an enlarged partial section of the master cylinder of FIG. 6, illustrating operation of the blow-off valve applied thereto.

Referring now to FIGS. 6 and 7, there is illustrated the second embodiment of the master cylinder according to the present invention. In this embodiment, the construction of the cylinder housing 210 and the primary and secondary pistons 214 and 216 are substantially the same as that of the foregoing first embodiment. Therefore, in the description given herebelow; it is not necessary to repeat in detail the construction which appears in the drawings. The features having substantially the same construction as that of the first embodiment and effecting the same function will be represented by a referrence numerals two hundred greater than that of the first embodiment. The principle difference between the first and second embodiments is the construction of the blow-off valve assembly 300.

The blow-off valve assembly 330 generally comprises a valve member 332 disposed within the bore 232. The valve member 332 has generally disc-shaped head 334, a stem 336 and a pivot 338. The disc-shaped head 334 is disposed in the bore adjacent the end of the compensation passage 238. The stem 336 extends through the compensation passage 238 and places the lower end thereof in the secondary fluid chamber 272. The disc-shaped head 334 is normaly urged toward the end of the compensation passage 238 by a set spring 340. The other end of the set spring 340 is seated onto a plug 342 engaged onto the end of the bore 232 adjacent the fluid reservoir 224. The pivot 338 extends laterally from the stem 336 to abut against the internal periphery of the compensation passage 238. The pivot 338 permits rotation of the valve member thereabout.

The compensation passage 238 is communicated with a horizontal opening 344 formed in the cylinder housing 210 in parallel relationship with the cylinder housing bore 212. The opening 344 establishes communication between the secondary port 346 and the secondary pressure chamber 220 via a compensation passage 348.

A thrusting member 350 is disposed within the opening 344. The thrusting member 350 has a head section 352 with a sealing ring 354. The opening 344 has a stepped section 355. Between the stepped section 355 and the head section 352, a set spring 356 is disposed to urge the thrusting member 350 to a plug 358 secured on the secondary port 346.

In FIG. 6, there is illustrated the position the brake pedal being released. In this position, the end of the stem 336 abuts against the flange section 268 to rotate the valve member 332 about the pivot 338. Therefore, the disc-shaped head 334 is partly released from the end of the compensation passage 238 to permit the fluid flow from the fluid reservoir 224 to the secondary fluid chamber 272.

Figure 8:
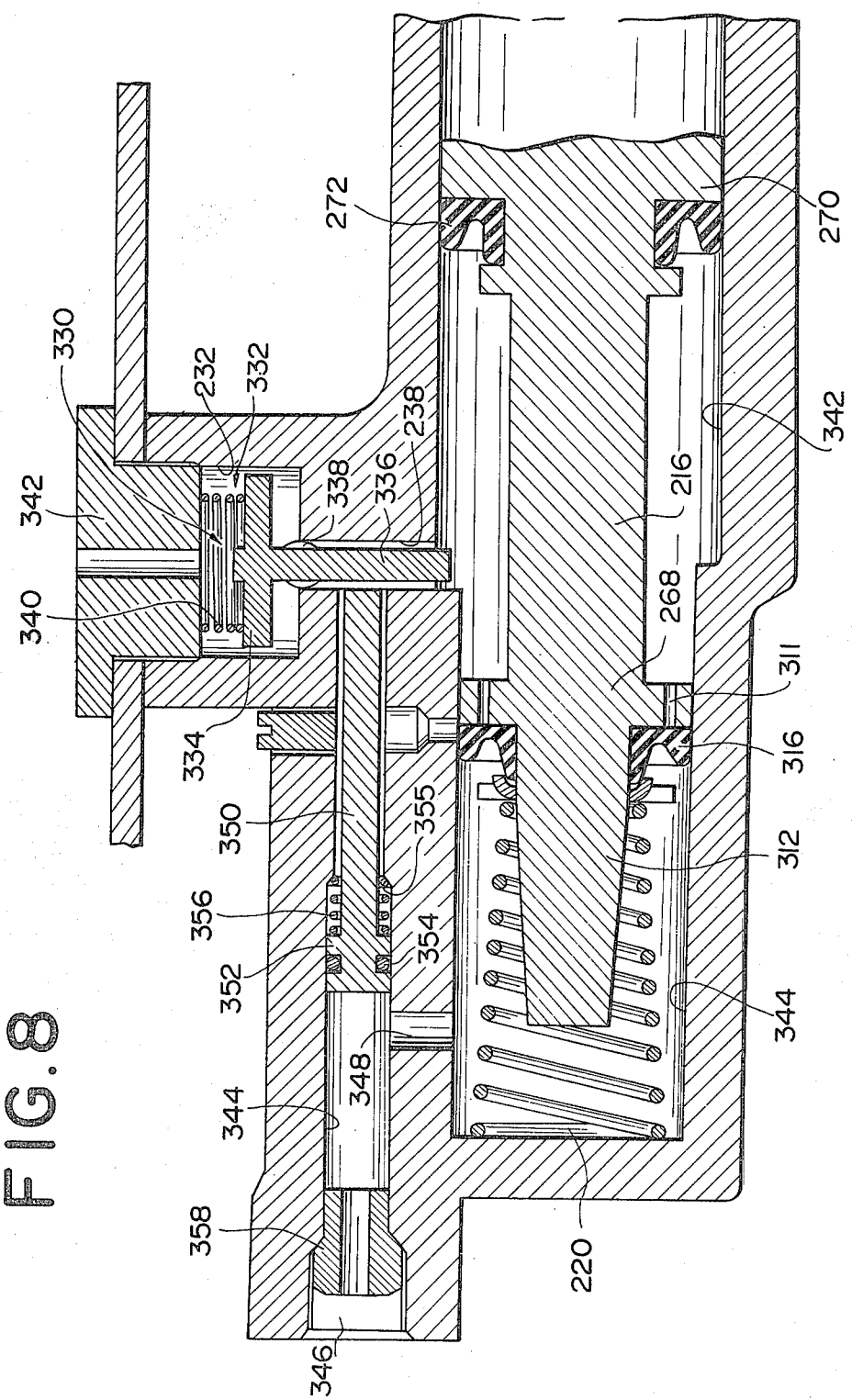
FIG. 8 is a similar view to FIG. 7 but showing the valve position where the valve member is released from the end of the compensation passage by the fluid pressure in the secondary fluid chamber.
Figure 9:
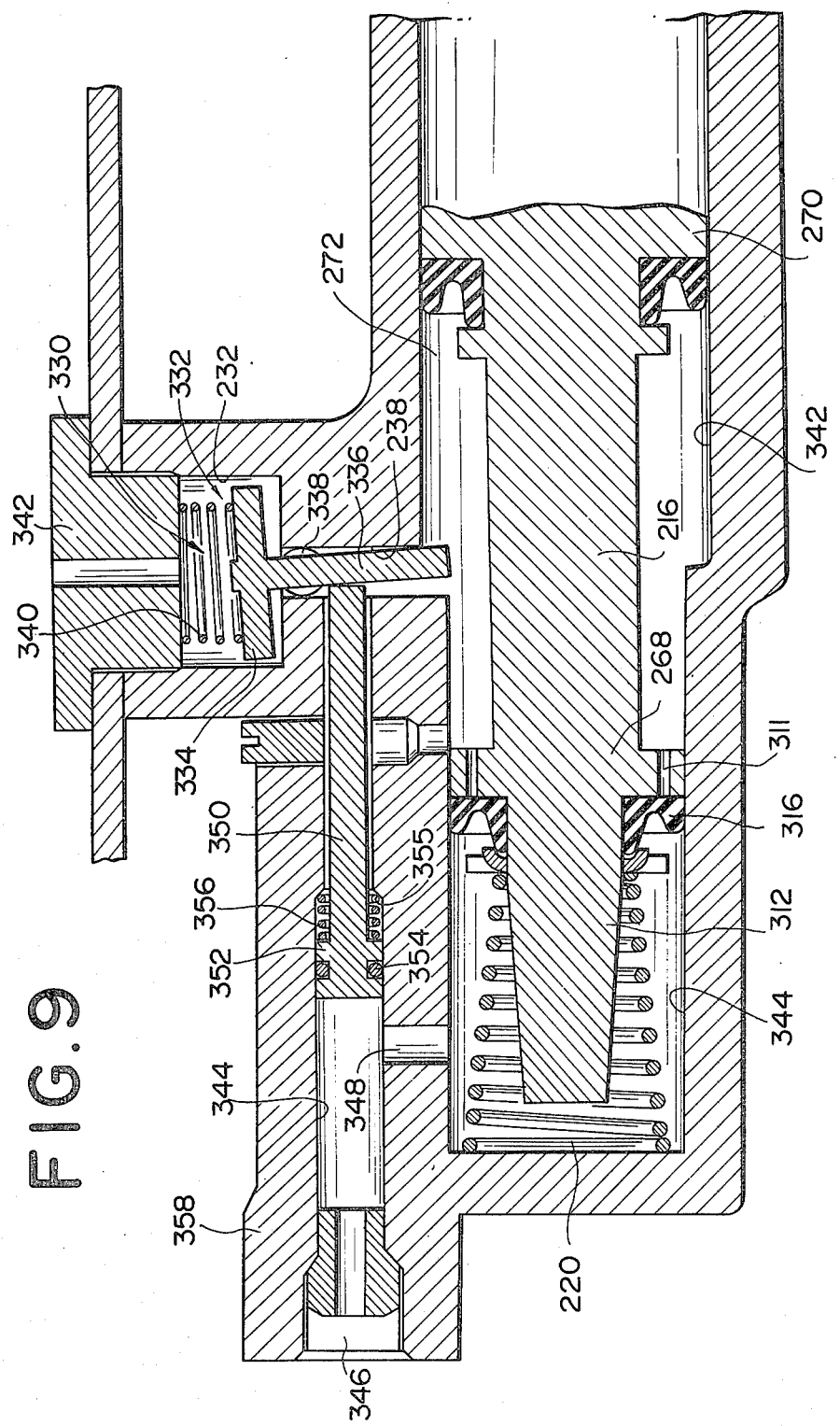
FIG. 9 is a similar view to FIG. 7 but showing the valve position where the thrusting member is displaced to abut against the valve member to rotate the latter.

Corresponding to the application of the brake pedal and, in turn, corresponding to the motion of the secondary piston 216, the valve member 332 is forced to the end of the compensation passage 238, as shown in FIG. 7. By further depression of the brake pedal, the secondary piston 216 is moved to reduce the volume of the secondary fluid chamber 272 to increase the fluid pressure therein. When the fluid pressure in the secondary fluid chamber 272 becomes greater than the set pressure of the valve member 332, the valve member is moved against the set pressure given by the set spring 340 to release the head 334 from the end of compensation passage 238, as shown in FIG. 8. Thus, the pressurized fluid flows from the secondary fluid chamber 272 to the fluid reservoir 224. In this valve position, the secondary piston further travels to reduce the volume of the secondary pressure chamber 220 to output the pressurized fluid to the front wheel cylinder. When the fluid pressure flowing in the opening 344 exceeds the set pressure of the thrusting member, the thrusting member 350 is moved to the compensation passage 238 and finally abuts against the stem 336 of the valve member 332 as shown in FIG. 9. The valve member 332 is thus rotated about the pivot 338 to permit the fluid flow from the secondary fluid chamber 272 to the fluid reservoir 224.

Figure 10:
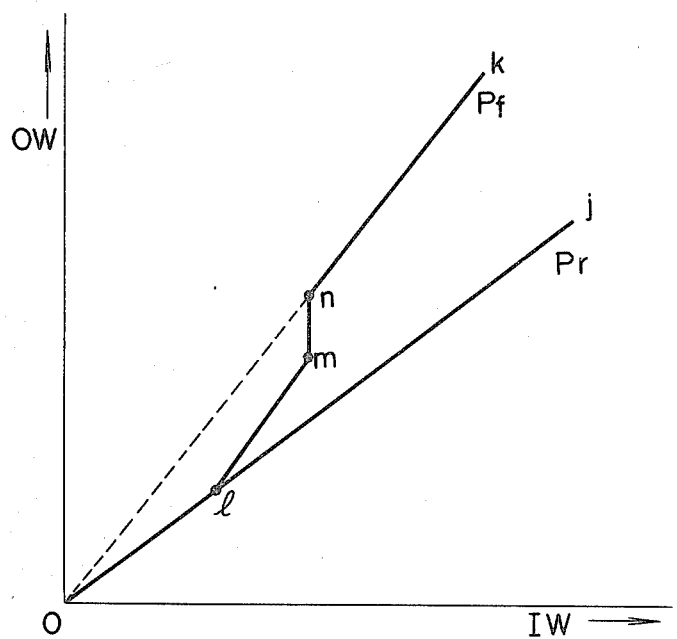
FIG. 10 is a similar view to FIG. 4, showing relationship of the input force (IW) and the output force (OW) when the master cylinder of FIG. 6 is in operation.
Figure 11:
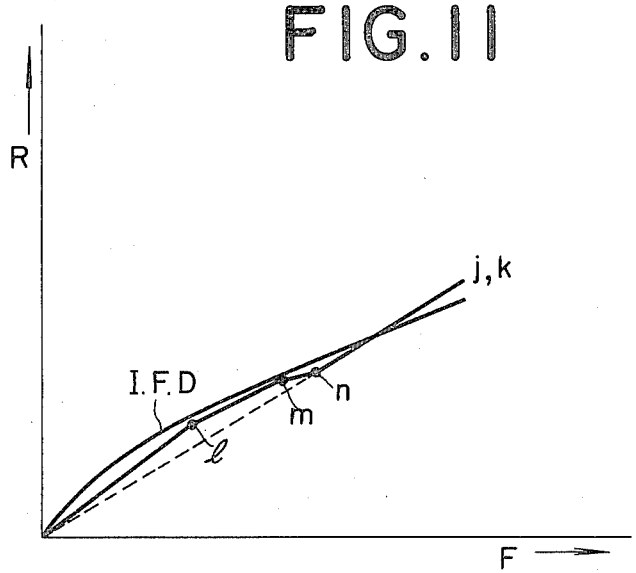
FIG. 11 is a similar view to FIG. 5, showing the relationship of the front and rear brake forces when the master cylinder of FIG. 6 is in operation.

By the above-mentioned valve member function, the fluid pressure in the secondary fluid chamber 272 is maintained substantially the same as the pressure in the fluid reservoir 224. Varying of the brake pressure corresponding to the depression of the brake pedal is as shown in FIG. 10. As shown in FIG. 10, the brake pressure in the rear wheel cylinder (Pr) is varied as represented by line o-l-j. On the other hand, the front wheel cylinder brake pressure (Pf) is varied as represented by the line o-l-m-n-k. In FIG. 10, at the split point 1, the valve member 332 is released from the end of the compensation passage 238 by the fluid pressure in the secondary fluid chamber 272. At the point n, the thrusting member 350 comes into contact with the stem 336 of the valve member and at the point m, the valve member 332 is fully opened to permit the fluid flow freely.

In the above-explained valve operation, there is achieved a varying of the rear wheel brake pressure with respect to the front wheel brake pressure.

When the brake pedal is released from the braking force, the primary and secondary pistons are returned to the initial positions thereof by the spring pressure of the set springs. In this return stroke, the valve member permits the fluid flow from the fluid reservoir to the secondary fluid chamber by abutment of the flange section and the stem of the valve member.

The present invention described as hereabove can thus fulfill the objects sought to the invention.

What is claimed is:

1. A tandem master cylinder in a brake system for an automotive vehicle comprising:
    a cylinder housing formed with a stepped bore along the longitudinal axis thereof and having a smaller diameter section adjacent the bottom thereof;
    a primary piston disposed within said bore and defining a primary fluid chamber between the internal periphery of said bore and the periphery of said primary piston, said primary fluid chamber being in communication with a fluid reservoir through a first fluid passage formed in said cylinder housing;
    a secondary piston disposed within said bore in tandem relationship with said primary piston and defining a primary pressure chamber between same and said primary piston, said primary pressure chamber in fluid communication with rear wheel cylinders in the brake system, said secondary piston also defining a secondary pressure chamber which communicates with front wheel cylinders in the brake system within said smaller diameter section of the bore and further defining a secondary fluid chamber between the internal periphery of said bore and the periphery of said secondary piston, said secondary fluid chamber being in fluid communication with the fluid reservoir through a second fluid passage formed in said cylinder housing;
    a first and second means for establishing communication respectively between said primary fluid chamber and said primary pressure chamber and said secondary fluid chamber and said secondary pressure chamber; and
    a blow-off valve assembly disposed between said secondary fluid chamber and said fluid reservoir for relieving hydraulic pressure in said secondary fluid chamber in response to a fluid pressure in said secondary fluid chamber exceeding a first predetermined pressure, said blow-off valve assembly responsive to the fluid pressure in said secondary pressure chamber exceeding a second predetermined pressure to adjust said first predetermined pressure.

2. A master cylinder as set forth in claim 1, wherein said secondary piston has first and second end sections having different sectional areas with respect to one another, said first end section is positioned adjacent said secondary pressure chamber and said second end section is positioned adjacent said primary pressure chamber, and said first end section has a smaller diameter than that of said second end section.

3. A master cylinder as set forth in claim 2, wherein said first end section of said secondary piston is positioned at the end of said smaller diameter section remote from said bottom of the bore.

4. A master cylinder for an automotive brake system comprising:
    a housing defining therein a bore;
    primary and secondary pistons disposed within said bore to define primary and secondary pressure chambers therein, said primary piston further defining a primary fluid chamber, and said secondary piston further defining a variable volume secondary fluid chamber, said primary fluid chamber communicating with said primary pressure chamber and said secondary fluid chamber communicating with said secondary pressure chamber;
    a fluid reservoir associated with said housing and in communication between said primary and secondary fluid chambers via first and second fluid passages;
    a valve disposed in said second passage and responsive to the fluid pressure in said secondary fluid chamber to establish communication between said secondary fluid chamber and said fluid reservoir when the fluid pressure in said secondary fluid chamber exceeds a first set pressure; and
    a valve control means disposed in said second passage in cooperation with said valve, and responsive to the fluid pressure in said secondary pressure chamber, said valve control means being movable between a first position in which fluid flow via said second passage is limited and a second position in which full communication of fluid flow through said second passage is permitted, said valve control means movable from said first position to said second position to adjust said first set pressure at a lower value when said fluid pressure in said secondary pressure chamber exceeds a second set pressure.

5. The master cylinder as set forth in claim 4, which further comprises a first resilient member associated with said valve to provide said first set pressure therefor.

6. The master cylinder as set forth in claim 6, wherein said valve comprises a ball member seating on a valve seat which serves as part of said valve control means, said ball member being biased to said first position with a second resilient member with said second set pressure.

7. The master cylinder as set forth in claim 6, wherein said first resilient member has a resilient force smaller than that of said second resilient member so that it may provide said first set pressure smaller than that of said second set pressure.

8. A tandem master cylinder in a brake system for an automotive vehicle comprising:

a cylinder housing formed with a stepped bore along the longitudinal axis thereof and having a smaller diameter section adjacent the bottom thereof;

a primary piston disposed within said bore and defining a primary fluid chamber between the internal periphery of said bore and the periphery of said primary piston, said primary fluid chamber being in communication with a fluid reservoir through a first fluid passage formed in said cylinder housing;

a secondary piston disposed within said bore in tandem relationship with said primary piston and defining a primary pressure chamber between same and said primary piston, said primary pressure chamber in fluid communication with rear wheel cylinders in the brake system, said secondary piston also defining a secondary pressure chamber which communicates with front wheel cylinders in the brake system within said smaller diameter section of the bore and further defining a secondary fluid chamber between the internal periphery of said bore and the periphery of said secondary piston, said secondary fluid chamber being in fluid communication with the fluid reservoir through a second fluid passage formed in said cylinder housing;

a first and second means for establishing communication respectively between said primary fluid chamber and said primary pressure chamber and said secondary fluid chamber and said secondary pressure chamber; and a blow-off valve assembly disposed between said secondary fluid chamber and said fluid reservoir for relieving hydraulic pressure in said secondary fluid chamber in response to a fluid pressure in said secondary fluid chamber exceeding a first predetermined pressure, said blow-off valve assembly in communication with both said secondary fluid chamber and said secondary pressure chamber, and movable between a first position blocking fluid flow from said secondary fluid chamber to said fluid reservoir, a second position permitting fluid flow from said secondary fluid chamber to said fluid reservoir in limited amount and a third position freely permitting fluid flow therethrough, said blow-off valve assembly responsive to fluid pressure in said secondary pressure chamber exceeding a second predetermined pressure to adjust said first predetermined pressure to move said valve assembly to said second position.

9. A master cylinder as set forth in claim 8, wherein said valve member is provided with first and second set pressures respectively corresponding to the fluid pressure in the secondary fluid chmber and said secondary pressure chamber, said first set pressure being smaller than that of the second set pressure for operating said valve assembly to said second valve position when the fluid pressure in the secondary fluid chamber exceeds said first set pressure.

10. A master cylinder as set forth in claim 8, wherein said blow-off valve assembly comprises a valve means disposed between said secondary fluid chamber and said fluid reservoir, and in fluid communication with said secondary fluid chamber to be responsive to the fluid pressure therein, and means in fluid communication with said secondary pressure chamber to be responsive to the fluid pressure therein for adjusting said first predetermined pressure when said fluid pressure in said secondary pressure chamber exceeds said second predetermined pressure.

11. A tandem master cylinder in a brake system for an automotive vehicle comprising:

a cylinder housing formed with a stepped bore along the longitudinal axis thereof and having a smaller diameter section adjacent the bottom thereof;

a primary piston disposed within said bore and defining a primary fluid chamber between the internal periphery of said bore and the periphery of said primary piston, said primary fluid chamber being in communication with a fluid reservoir through a first fluid passage formed in said cylinder housing;

a secondary piston disposed within said bore in tandem relationship with said primary piston and defining a primary pressure chamber between same and said primary piston, said primary pressure chamber in fluid communication with rear wheel cylinders in the brake system, said secondary piston also defining a secondary pressure chamber which communicates with front wheel cylinders in the brake system within said smaller diameter section of the bore and further defining a secondary fluid chamber between the internal periphery of said bore and the periphery of said secondary piston, said secondary fluid chamber being in fluid communication with the fluid reservoir through a second fluid passage formed in said cylinder housing, said secondary piston having first and second end sections having different sectional areas with respect to one another, said first end section positioned adjacent said secondary pressure chamber and said second end section positioned adjacent said primary pressure chamber, and said first end section having a smaller diameter than that of said second end section;

a first and second means for establishing communication respectively between said primary fluid chamber and said primary pressure chamber and said secondary fluid chamber and said secondary pressure chamber; and a blow-off valve assembly disposed between said secondary fluid chamber and said fluid reservoir for relieving hydraulic pressure in said secondary fluid chamber in response to a fluid pressure in said secondary fluid chamber exceeding a first predetermined pressure, said blow-off valve assembly in communication with both said secondary fluid chamber and said secondary pressure chamber, and movable between a first position blocking fluid flow from said secondary fluid chamber to said fluid reservoir, a second position permitting fluid flow from said secondary fluid chamber to said fluid reservoir in limited amount and a third position freely permitting fluid flow therethrough, said blow-off valve assembly responsive to fluid pressure in said secondary pressure chamber exceeding a second predetermined pressure to adjust said first predetermined pressure to move said valve assembly to said second position.

12. A tandem master cylinder in a brake system for an automotive vehicle comprising:

a cylinder housing formed with a stepped bore along the longitudinal axis thereof and having a smaller diameter section adjacent the bottom thereof;

a primary piston disposed with said bore and defining a primary fluid chamber between the internal periphery of said bore and the periphery of said primary piston, said primary fluid chmber being in communication with a fluid reservoir through a first fluid passage formed in said cylinder housing;

a secondary piston disposed within said bore in tandem relationship with said primary piston and defining a primary pressure chamber between same and said primary piston, said primary pressure chamber in fluid communication with rear wheel cylinders in the brake system, said secondary piston also defining a secondary pressure chamber which communicates with front wheel cylinders in the brake system within said smaller diameter section of the bore and further defining a secondary fluid chamber between the internal periphery of said bore and the periphery of said secondary piston, said secondary fluid chamber being in fluid communication with the fluid reservoir through a second fluid passage formed in said cylinder housing, said secondary piston having first and second end sections having different sectional areas with respect to one another, said first end section positioned adjacent said secondary pressure chamber and said second end section positioned adjacent said primary pressure chamber, and said first end section having a smaller diameter than that of said second end section, and said first end section of said secondary piston positioned at the end of said smaller diameter section remote from said bottom of the bore;

a first and second means for establishing communication respectively between said primary fluid chamber and said primary pressure chamber and said secondary fluid chamber and said secondary pressure chamber; and a blow-off valve assembly disposed between said secondary fluid chamber and said fluid reservoir for relieving hydraulic pressure in said secondary fluid chamber in response to a fluid pressure in said secondary fluid chamber exceeding a first predetermined pressure, said blow-off valve assembly in communication with both said secondary fluid chamber and said secondary pressure chamber, and movable between a first position blocking fluid flow from said secondary fluid chamber to said fluid reservoir, a second position permitting fluid flow from said secondary fluid chamber to said fluid reservoir in limited amount and a third position freely permitting fluid flow therethrough, said blow-off valve assembly responsive to fluid pressure in said secondary pressure chamber exceeding a second predetermined pressure to adjust said first predetermined pressure to move said valve assembly to said second position.

* * * * *